(12) United States Patent
Talbot

(10) Patent No.: US 7,947,944 B2
(45) Date of Patent: May 24, 2011

(54) LASER TRANSMITTER, LASER RECEIVER AND METHOD

(75) Inventor: Nicholas Charles Talbot, Ashburton (AU)

(73) Assignee: Trimble Navigation Limited, Sunnyvale, CA (US)

( * ) Notice: Subject to any disclaimer, the term of this patent is extended or adjusted under 35 U.S.C. 154(b) by 131 days.

(21) Appl. No.: 12/263,772

(22) Filed: Nov. 3, 2008

(65) Prior Publication Data

US 2010/0108858 A1     May 6, 2010

(51) Int. Cl.
 - *G06M 7/00* (2006.01)
 - *G01J 1/20* (2006.01)
 - *G01C 9/00* (2006.01)

(52) U.S. Cl. .................. 250/221; 250/201.2; 356/247

(58) Field of Classification Search .............. 250/205, 250/216, 221, 552, 553, 201.1–201.4, 222.1, 250/237 R, 237 G; 372/50; 369/44.14, 112.14; 356/141, 152, 247, 248; 359/321, 576, 864

See application file for complete search history.

(56) References Cited

U.S. PATENT DOCUMENTS

| | | | |
|---|---|---|---|
| 4,062,634 A | 12/1977 | Rando et al. | |
| 4,676,598 A | 6/1987 | Markley et al. | |
| 4,767,208 A | 8/1988 | Cain et al. | |
| 6,052,181 A | 4/2000 | Maynard et al. | |
| 6,614,825 B1 * | 9/2003 | Hang et al. | 372/50.1 |
| 6,636,653 B2 | 10/2003 | Miracky et al. | |
| 6,643,004 B2 | 11/2003 | Detweiler et al. | |
| 7,119,316 B2 | 10/2006 | Green et al. | |
| 7,224,473 B2 | 5/2007 | Zalusky | |
| 7,354,167 B2 | 4/2008 | Cho et al. | |

OTHER PUBLICATIONS

Lee et al., Magnetostrictive Micro Mirrors for an Optical Switch Matrix, Sensors 2007, 7,2164-2182, Oct. 9, 2007.
Jain et al., A Two-Axis Electrothermal SCS Micromirror for Biomedical Imaging, 2003 IEEE/LEOS International Conference on Optical MEMS, Aug. 18-21, 2003, pp. 14-15.

* cited by examiner

*Primary Examiner* — Georgia Y Epps
*Assistant Examiner* — Don Williams
(74) *Attorney, Agent, or Firm* — Dinsmore & Shohl LLP

(57) ABSTRACT

A combination of a laser transmitter and a laser receiver and a method determine the elevation of the receiver with respect to the transmitter. The laser transmitter includes a a laser light source for providing a beam of laser light and an element for directing the beam. The beam diverges vertically and varies in intensity vertically. A laser receiver includes an array of laser beam detectors for detecting the beam and the variations in the beam intensity in a vertical direction. The vertical position of the laser receiver with respect to the laser transmitter can be determined in this manner. The beam varies in intensity vertically in a predetermined vertical pattern, and the laser receiver detects at least a portion of the pattern defined by the beam such that the portion of the beam detected by the laser receiver may be determined.

23 Claims, 4 Drawing Sheets

LASER TRANSMITTER, LASER RECEIVER AND METHOD

CROSS-REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

Laser transmitters have been used in a variety of ways in the construction and surveying industries. In a typical application at a construction site, a laser transmitter projects a plane of laser light for use as a position reference by workers, and by various machines carrying laser receivers. The machines may be operated by workers who view position displays, or may be operated automatically or semi-automatically by control systems that respond to the measured positions and elevations, and to a database of desired positions and elevations.

One type of laser based position and machine control system uses a laser transmitter that projects a thin cylindrical beam of laser light in a horizontal plane or in a precisely tilted plane, and continuously rotates the beam in the plane. A laser receiver, which may include a plurality of photo detectors arranged in a vertical row, is mounted on a mast carried by a construction machine. By sensing the plane of laser light, the machine control system determines the elevation of the receiver, and from that position determines the elevation of various machine elements. A comparison is made between the measured elevations and the desired elevations and the machine is then operated, either automatically or manually, in response to this comparison.

Another type of laser based position and machine control system uses a transmitter that projects a horizontal plane of laser light in all directions simultaneously. To accomplish this, a vertical beam of laser light is projected onto a conical reflector. While providing a very simple construction, a transmitter of this type is somewhat limited in operation and flexibility.

Laser based systems that project a plane of laser light using a rotating beam or a horizontally dispersed plane of light necessarily require that the receiver be relatively precisely positioned to receive the laser light so that position information can be developed. Some systems address this issue by using a transmitter that projects one or more tilted, fan-shaped beams of laser light, rotated about a vertical axis. While fan beam systems provide for a broader range of coverage, such systems may have other draw backs, including a difficulty in extracting complete position information from the receiver signals. Other systems use vertical arrays of photo detectors with more complex receivers, positioned on power extendable masts, to permit detection over a large range of elevations. None of these approaches has proved to be entirely satisfactory because of the difficulty encountered in adjusting mast height to place the receiver in the path of the beam, and the limited amount of vertical movement provided by such a mast.

Accordingly, there is a need for a laser transmitter, receiver, and method of operating the transmitter and receiver, in which the operation of the system is simplified, and in which accurate position and control information is readily available over a large range of elevations.

SUMMARY OF THE INVENTION

These needs are met by a combination of a laser transmitter and a laser receiver which determine the elevation of the receiver with respect to the transmitter. The laser transmitter includes a laser light source for providing a beam of laser light and an element for directing the beam. The beam diverges vertically and varies in intensity vertically. A laser receiver includes an array of laser beam detectors for detecting the beam and the variations in the beam intensity in a vertical direction. The vertical position of the laser receiver with respect to the laser transmitter can be determined in this manner. The beam varies in intensity vertically in a predetermined vertical pattern, and the laser receiver detects at least a portion of the pattern defined by the beam such that the portion of the beam detected by the laser receiver may be determined.

The laser transmitter and laser receiver for determining the elevation of the receiver with respect to the transmitter may be such that the pattern defined by the beam is cyclically varied. As a consequence, the ambiguities that might otherwise result as to the portion of the beam being detected by the laser receiver are eliminated. The pattern may include a reference section which permits the scale of the vertical dimensions of the pattern to be determined. The scale of the pattern in the reference section may be used to define the scale of the vertical dimensions of the balance of the pattern. The transmitter transmits a beam in a succession of vertical patterns such that when the receiver detects a portion of the beam, any ambiguity with respect to which portion of the beam is detected is eliminated. The succession of vertical patterns may constitute a plurality of vertical patterns which are cyclically repeated.

The transmitter may provide a beam of laser light which is directed generally horizontally and which diverges vertically to define a vertical pattern of varying intensity that is readable by the laser receiver. The array of laser beam detectors detects the beam and the variations in the beam intensity in a vertical direction such that the vertical position of the laser receiver with respect to the horizontal portion of the laser beam is determined. The variations in beam intensity may define a pattern having vertically spaced, generally horizontal bands of light and the pattern may include recognizable reference bands that define the size of the pattern. A portion of the pattern may be projected on a horizontal plane. The recognizable reference bands may be vertically spaced in the pattern such that the receiver will receive at least one such band.

A method of determining the relative elevation of a laser receiver with respect to a laser transmitter, comprising the steps of projecting a beam of laser light with a laser transmitter in a generally horizontal path, the beam diverging vertically and varying in intensity vertically, and detecting the beam of laser light at a plurality of vertically spaced points with a laser receiver including a vertical array of laser detectors such that the vertical position of the laser receiver with respect to the laser transmitter can be determined by determining the position of the laser receiver in the path of the beam of laser light. The step of projecting a beam of laser light comprises the step of projecting a beam that has a predetermined vertical pattern. The step of detecting the beam of laser light may comprise the step of detecting at least a portion of the pattern defined by the beam such that the portion of the beam detected by the laser receiver may be determined. The step of projecting a beam of laser light may comprise the step of cyclically varying the pattern defined by the beam such that ambiguities that might otherwise result as to which portion of the beam is detected by the laser receiver are eliminated. The pattern may include a reference section which permits the scale of the vertical dimensions of the patterns to be determined.

The step of projecting a beam of laser light may comprise the step of projecting a succession of vertical patterns such that when the receiver detects a portion of the beam, any ambiguity with respect to which portion of the beam is detected is eliminated. The step of projecting a beam of laser light may comprise the step of projecting variations in the beam intensity to define a pattern having generally horizontal bands of light and in which the pattern includes recognizable reference bands that define the size of the pattern, and in which a portion of the pattern is projected on a horizontal plane. The recognizable reference bands are preferably vertically spaced in the pattern such that the receiver will receive at least one such band.

The laser transmitter may include a laser light source for providing a beam of laser light and an element for directing the beam such that it diverges vertically and varies in intensity vertically. The element may include a micro mirror panel in which portions of the beam are reflected in a predetermined vertical pattern. The element may include a micro mirror panel arrange in a conical shape for reflecting portions of the beam in a predetermined vertical pattern. Alternatively, the element may include a plurality of micro mirror panels arrange in a pyramid shape for reflecting portions of the beam in a predetermined vertical pattern. Further, the element may include a flat micro mirror panel for reflecting portions of the beam received from the laser light source in a predetermined pattern, and a conical reflector receiving light from the micro mirror panel and reflecting the portion of the beam generally outward in predetermined vertical pattern. With such an arrangement, the portions of the beam received from the laser light source may be reflected from the flat micro mirror panel in a predetermined pattern of concentric rings of light and dark areas.

DETAILED DESCRIPTION OF THE PREFERRED EMBODIMENTS

Figure 1:
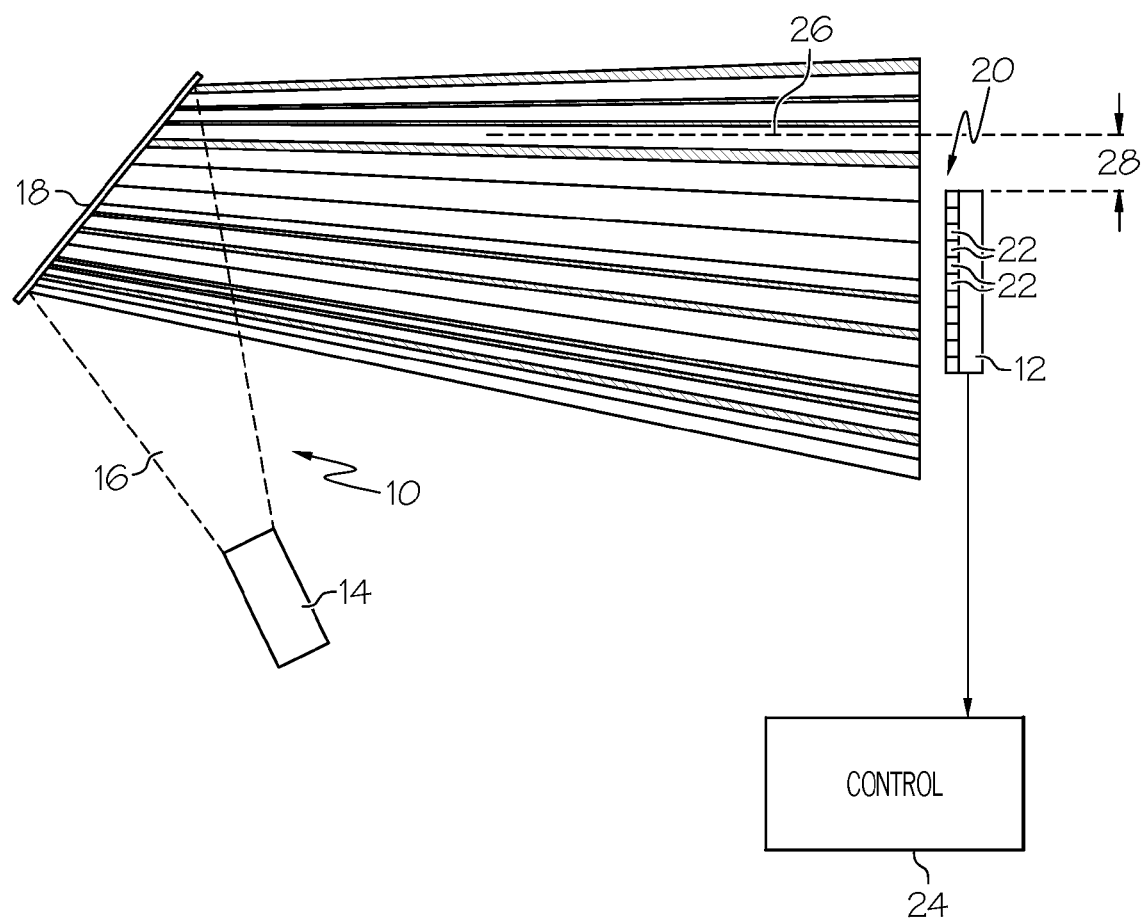
FIG. 1 is a diagrammatic representation of one embodiment of the laser transmitter and laser receiver.

FIG. 1 shows the combination of a a laser transmitter 10 and a laser receiver 12 for determining the elevation of the receiver 12 with respect to the transmitter 10. The laser transmitter 10 includes a laser light source 14 for providing a beam of laser light 16. The laser transmitter 10 further includes an element 18 for directing the beam 16 so that it diverges vertically and varies in intensity vertically, as explained more fully below. The laser receiver 12 includes an array 20 of laser light detectors 22 for detecting the beam 16 and the variations in the beam intensity in a vertical direction. By this arrangement, the vertical position of the laser receiver 12 is determined with respect to the laser transmitter 10.

As indicated diagrammatically in FIG. 1, the beam 16 varies in intensity vertically and defines a predetermined vertical pattern. The dark bars in FIG. 1 indicate planes of various thicknesses where there is no laser light, with the interleaved light bars indicating planes of light of various thicknesses. The word "plane" is used here not in the strict geometric sense. Rather, "plane" is used to indicate an area of the beam which is relatively thin and relatively wide and which, if intercepted by a vertical surface (such as a hypothetical surface located at the receiver 12 in FIG. 1) defines a horizontal light or dark bar or band of the pattern. These vertically spaced, interleaved planes of light and dark are not unlike the pattern of a bar code. The receiver 12 provides outputs to control 24 which, having previously stored the entire pattern defined by beam 16, matches the sensed pattern of the beam against this stored pattern to determine the part of the beam that is being received by the receiver 12. FIG. 1 depicts a relatively few planes of light and interleaved dark planes for purposes of clarity. In an actually, a beam having a great many more plane of light will be projected. Similarly, only a few detectors 22 are illustrated in FIG. 1. An implementation will have a great many more detectors in a vertical column so that the pattern projected by the beam 16 can be detected precisely.

It may sometimes occur that the portion of the beam detected does not provide enough information for the control 24 to determine precisely the portion of the beam 16 being detected by the receiver 12. This may occur as a result of the receiver detecting one of two or more small portions of the beam having the same pattern of light and dark areas. To avoid the resulting ambiguity, the transmitter 10 may be set to transmit in succession a series of different predetermined patterns. Since the pattern defined by the beam is cyclically varied, it is unlikely that the position of the receiver in each pattern will be ambiguous. Further, it is even less likely that the receiver 12 might be positioned such that the portion of the beam pattern for each pattern is ambiguous and the ambiguity is not resolved by the detected series of ambiguous positions. As an example, using 1 to designate a light plane of one unit vertical dimension and 0 to designate a dark plane of one unit vertical dimension, if the detected sequence 10001100101110 is detected and this sequence occurs more than once in the light pattern, the position of the receiver may be ambiguous. It is unlikely, however, when a next sequence is projected in rapid succession and detected, such as 10001100001001, that the received sequence will also be ambiguous. Even if the second sequence is ambiguous, it is even less likely that this second ambiguous sequence and the first sequence, when taken together will result in an ambiguity. That is, it is extremely unlikely that more than one portion of the beam will have the 10001100101110 sequence when the first pattern is projected and the 10001100001001 pattern when the second pattern is projected. It will be appreciated that cyclically varying the pattern through a greater number of distinct patterns makes the possibility of ambiguous position detection even less likely.

As will be noted from FIG. 1, the beam 16 diverges vertical as it moves to the right. This results in the vertical dimensions of the dark planes and light planes increasing as the receiver 12 moves away from the transmitter 10. The beam 16 may have a pattern which includes a reference section which permits the scale of the vertical dimensions of the pattern to be determined. For example, the pattern may include a reference section 10101010 which defines the scale of the vertical dimensions of the balance of the pattern. The 010101010 pattern is used within the beam 16 only for reference. Any interleaved pattern of four light planes and five dark planes will be recognized as being the reference section. The receiver 12 and control 24 then interpret the balance of the sensed pattern based on the dimensions of the reference section. That is, the scale of the pattern in the reference section defines the scale of the vertical dimensions of the balance of the pattern. If a dark plane or light plane is twice the thickness of the light and dark planes in the reference thickness, this indicates a plane that is two units in vertical dimension. If desired, the reference section or reference band of the beam may be repeated a number of times within the pattern projected by the transmitter. The reference sections or reference bands are spaced apart such that a receiver positioned anywhere within the beam will receive at least one such reference section. The reference process also enables the receiver to determine its separation from the transmitter.

The transmitter 10 provides a beam of laser light 16, a ray of which is directed generally horizontally, indicated at 26. Although the beam 16 as a whole diverges vertically, a ray 26 in the beam remains horizontal. The array 20 of laser beam detectors 22 detects the beam 16 and the variations in the beam intensity in a vertical direction such that the vertical position of the laser receiver with respect to the horizontal portion 26 of the laser beam 16 is determined. As shown in FIG. 1, the top of the receiver 12 is a distance 28 below the horizontal ray 26. The control is therefore able to determine the vertical position of the receiver 12.

Various implementations of the transmitter 10 permit it to project planes of interleaved light and dark areas. The element 18 for directing the beam 16 so that it diverges vertically and varies in intensity vertically may include a panel of micro mirrors. Arrays of such micro mirrors have been developed for a number of different applications. Micro mirror arrays have been incorporated in high definition television systems, and in optical multiplexing and optical switching systems. Various array constructions are known in the art. "Magnetostrictive Micro Mirrors for an Optical Switch Matrix," Lee et al, published in Sensors, October 2007, pages 2174-2182, describes a magnetostrictive arrangement for mirror actuation, while "A Two-Axis Electrothermal Micro Mirror for Biomedical Imaging," 2003 IEEE/LEOS International Conference on Optical MEMS, August 2003, pages 14-15, describes a thermal actuation arrangement for micro mirrors. U.S. Pat. No. 7,354,167, issued Apr. 8, 2008, incorporated herein by reference, discloses micro mirror arrays that focus, deflect, and scan light beams, and in which the mirrors are moved electrostatically or electromagnetically.

Figure 2A:
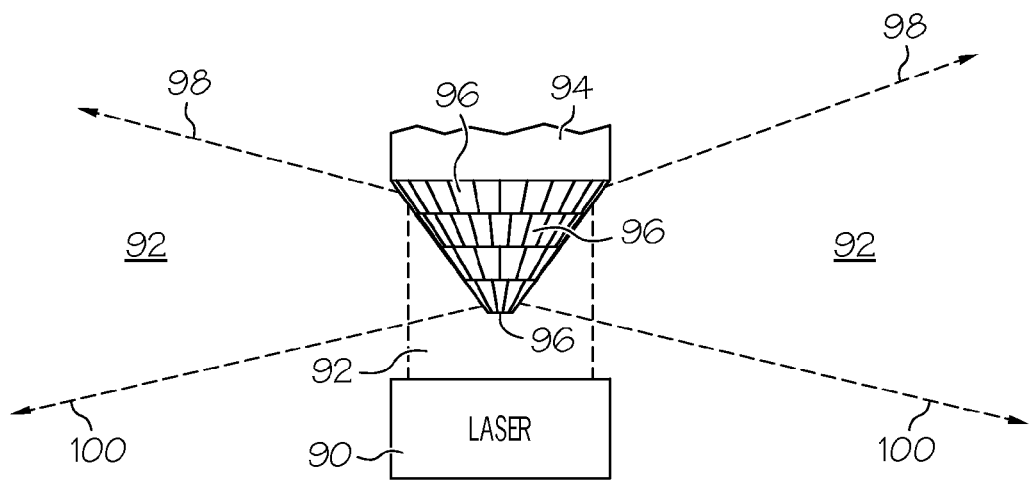
FIG. 2A is a side view of a transmitter, illustrating an element for directing the beam that incorporates micro mirrors.
Figure 2B:
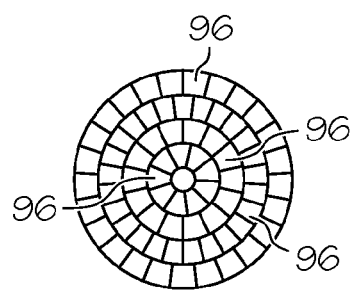
FIG. 2B is a view of the element for directing the beam of FIG. 2A, as seen from below.

FIGS. 2A and 2B show a second embodiment of a transmitter, in which a laser 90 directs a beam 92 vertically toward a beam directing or diverting element 94. Diverting element 94 in this embodiment includes an array of a large number of digital micro mirror devices 96 arranged collectively in the shape of an inverted truncated cone. The micro mirror devices 96 are shown for simplicity of illustration in FIG. 2B, which is a view of the diverting element 94 as seen from below, as arranged in four concentric, circular rows. It will be appreciated, however, that a significantly greater number of micro mirror devices arranged in a significantly greater number of concentric circular rows will actually be utilized in the laser transmitter. In fact, the overall array of the beam diverting element 94 may include millions of hinge-mounted microscopic mirror devices, each of which has dimensions less than the width of a human hair. The micro mirrors in these devices can be tilted on their respective hinges by the application of electrical signals to associated electrodes at a high frequency, up to several thousand times per second.

When the micro mirrors are in a first position, the light in beam 92 is reflected generally radially outward, diverging upward for the light reflected from the upper rows of micro mirrors as indicated by rays 98, and diverging downward for the light reflected from the lower rows of micro mirrors, as illustrated by rays 100. When the micro mirrors are pivoted to a second position, the light in the beam 92 will be reflected downward toward the laser and will not form a part of the beam 92 projected outward. It will be appreciated that by switching bands of the micro mirrors between their respective two positions, radially extending planes of light and dark areas will be generated in a manner similar to that illustrated in FIG. 1. The micro mirrors can be switched rapidly so as to produce any desired sequence of radially extending patterns around the transmitter. The beam 92 may then be detected by a receiver, such as receiver 12, shown in FIG. 1, anywhere within the area surrounding the transmitter.

Figure 3A:
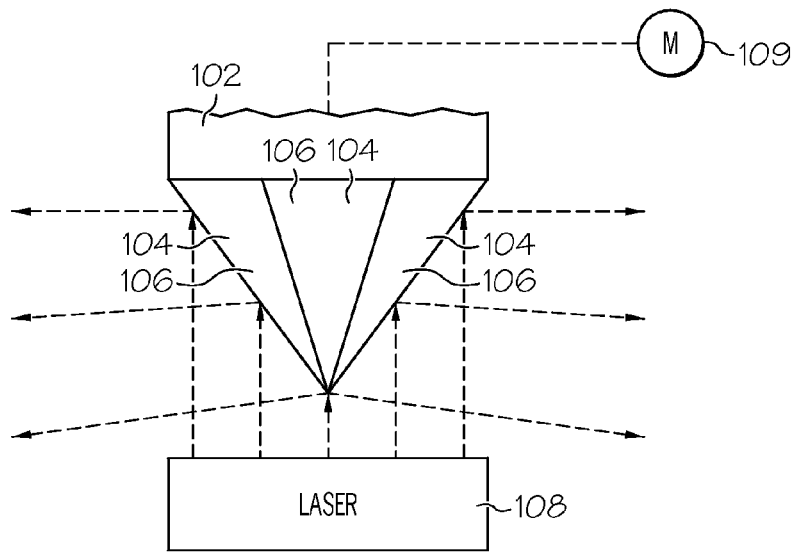
FIGS. 3A and 3B are views similar to FIGS. 2A and 2B, respectively, illustrating an element for directing the beam in which the micro mirrors are arranged in an eight-sided regular pyramid.
Figure 3B:
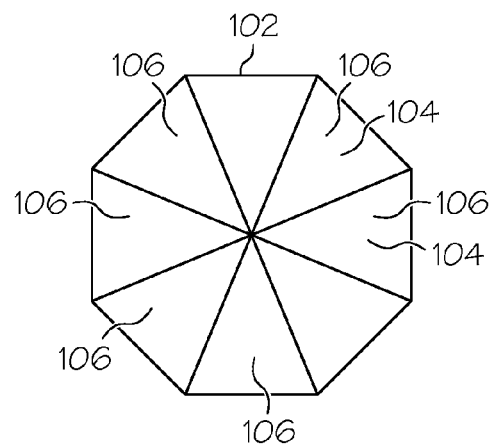

FIGS. 3A and 3B depict another embodiment of the transmitter of the present invention, which is similar to the embodiment of FIGS. 2A and 2B, but with the inverted conical array of micro mirror elements 96 being replaced by a diverting element 102 having arrays of micro mirror elements 104 arranged as an inverted, eight-sided, regular pyramid. The separation of the micro mirror elements 104 into eight triangular panels 106 will result in the reflection outward of eight separate beams of laser light from laser 108, with each beam having a triangular cross section. In order to illuminate the area around the entire circumference of the transmitter, the diverting element 102 may be rotated continuously about a vertical axis by a motor indicated diagrammatically at 109. Alternatively, the diverting element 102 may be rotated back and forth about a vertical axis by at least one-eighth of a rotation. It will be appreciated that the micro mirror elements 96 in the embodiment of FIGS. 2A and 2B will also reflect a number of discrete rays, and that by rotating diverting element 94 in a similar manner, a greater area around the transmitter will be swept with laser light.

Figure 4:
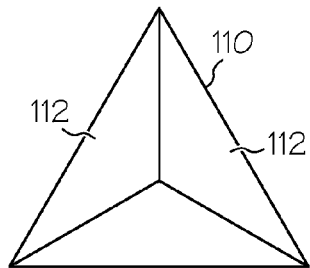
FIG. 4 illustrates an element for directing the beam in which the micro mirrors are arranged as a three-sided regular pyramid.
Figure 5:
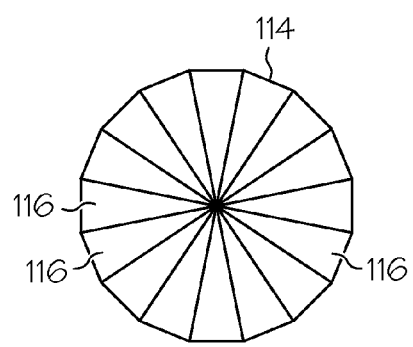
FIG. 5 illustrates an element for directing the beam in which the micro mirrors are arranged as a sixteen-sided regular pyramid.

Variations in the structure of the diverting element of the embodiment of FIGS. 3A and 3B are illustrated in FIGS. 4 and 5. In FIG. 4, a diverting element 110 has arrays of micro mirror elements 112 arranged as a three-sided, regular pyramid. In FIG. 5, a diverting element 114 has arrays of micro mirror elements 116 arranged as a sixteen-sided, regular pyramid. In both cases, the separation of the micro mirror elements into a plurality of panels will result in the reflection outward of a plurality of separate beams of light. Three such beams will result from the diverting element 110 in FIG. 4, and sixteen such beams will result from the diverting element 114 in FIG. 5. In both cases, the diverting element may either be rotated continuously, or rotated back and forth about a vertical axis of rotation, to provide for complete beam coverage around the circumference of the diverting element.

It will be appreciated that if it is not desired to project a series of patterns, but only a single pattern, then a simple mirrored surface may be utilized. For example, the element 18 in FIG. 1 may take the form of a surface having a number of mirrored horizontal stripes, with non-reflective interleaved areas. Similarly, the element 94 in FIG. 2A may have a series of reflective rings and interleaved, non-reflective areas.

Figure 6:
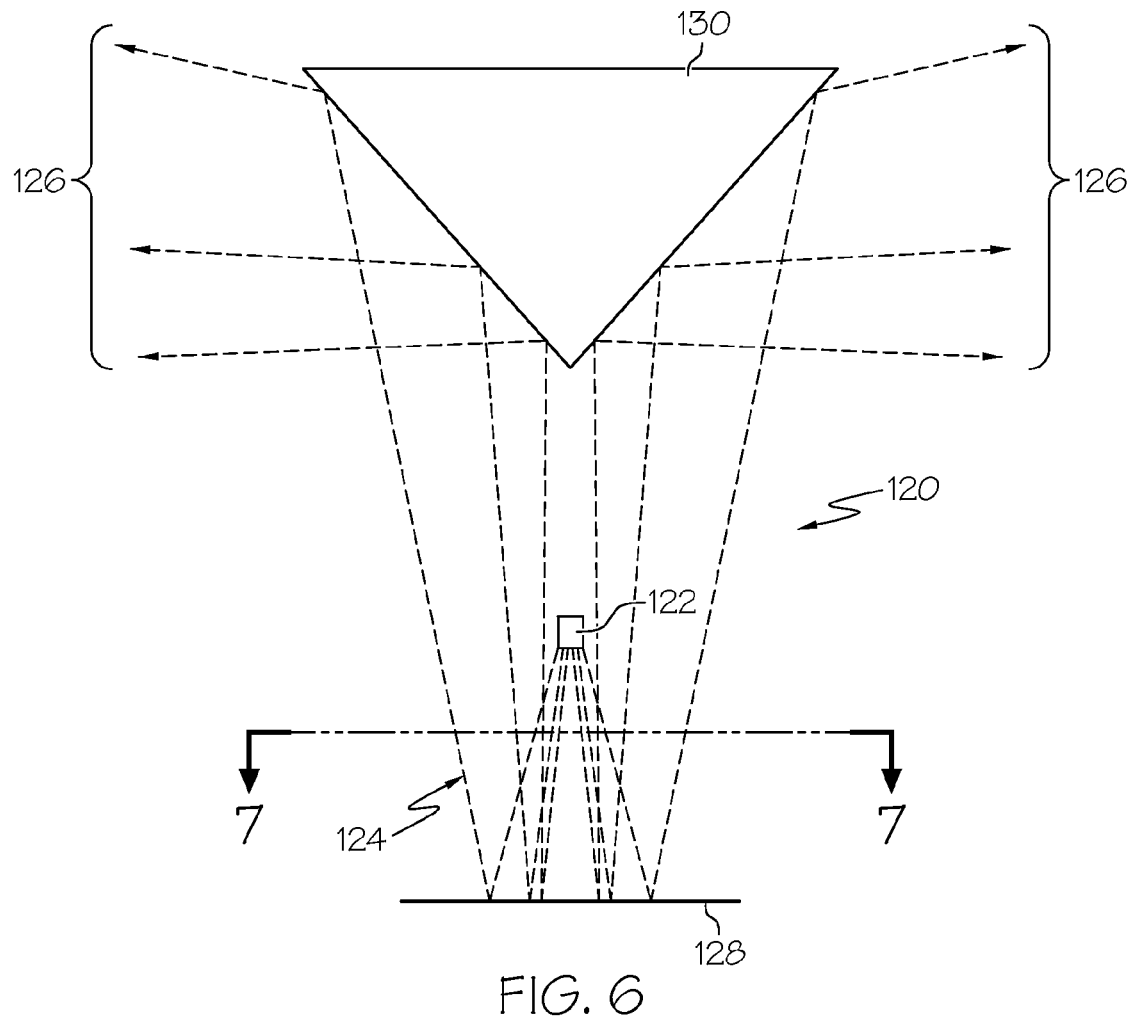
FIG. 6 is a diagrammatic view of another embodiment of the laser transmitter and laser receiver.
Figure 7:
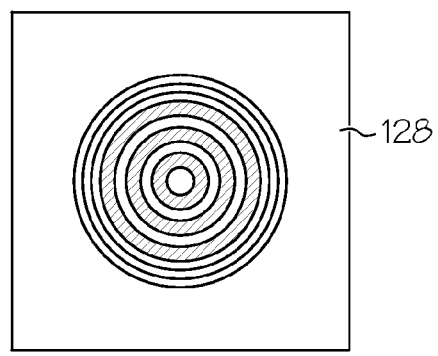
FIG. 7 is a view of the flat micro mirror reflector, taken generally along line 7-7 in FIG. 6.

Reference is made to FIGS. 6 and 7 which illustrate a further embodiment of the transmitter, indicated with reference numeral 120. The transmitter 120 includes a laser light source 122 that provides a beam of laser light 124. An element for directing the beam such that it diverges vertically and varies in intensity vertically as indicated at 126 includes a micro mirror panel 128. Panel 128 reflects the beam 124 in a predetermined pattern, such as shown in FIG. 7. The mirror panel 128 is flat and reflects portions of the beam received from the laser light source 122 in a pattern of concentric rings of light and dark areas. The light then is reflected upward to a conical reflector 130 where it is reflected radially outward in the desired vertical pattern.

Other aspects, objects, and advantages of the embodiments can be obtained from a study of the drawings, the disclosure, and the appended claims.

What is claimed is:

1. In combination, a laser transmitter and a laser receiver for determining the elevation of the receiver with respect to the transmitter, comprising:
    a laser transmitter including a laser light source for providing a beam of laser light and an element for directing the beam, said beam diverging vertically and varying in intensity vertically; and
    a laser receiver including an array of laser beam detectors for detecting the beam and the variations in the beam intensity in a vertical direction such that the vertical position of the laser receiver with respect to said laser transmitter can be determined.

2. The laser transmitter and laser receiver for determining the elevation of the receiver with respect to the transmitter according to claim 1, in which said beam varies in intensity vertically in a predetermined vertical pattern, and in which said laser receiver detects at least a portion of the pattern defined by said beam such that the portion of the beam detected by the laser receiver may be determined.

3. The laser transmitter and laser receiver for determining the elevation of the receiver with respect to the transmitter according to claim 2, in which the pattern defined by the beam is cyclically varied such that ambiguities that might otherwise result as to the portion of the beam being detected by the laser receiver are eliminated.

4. The laser transmitter and laser receiver for determining the elevation of the receiver with respect to the transmitter according to claim 3, in which said transmitter transmits a beam in a succession of vertical patterns such that when said receiver detects a portion of the beam, any ambiguity with respect to which portion of the beam is detected is eliminated.

5. The laser transmitter and laser receiver for determining the elevation of the receiver with respect to the transmitter according to claim 4, in which said succession of vertical patterns constitutes a plurality of vertical patterns which are cyclically repeated.

6. The laser transmitter and laser receiver for determining the elevation of the receiver with respect to the transmitter according to claim 2, in which said pattern includes a reference section which permits the scale of the vertical dimensions of the pattern to be determined.

7. The laser transmitter and laser receiver for determining the elevation of the receiver with respect to the transmitter according to claim 6, in which the scale of said pattern in said reference section defines the scale of the vertical dimensions of the balance of the pattern.

8. The laser transmitter and laser receiver for determining the elevation of the receiver with respect to the transmitter according to claim 1, in which said transmitter provides a beam of laser light which is directed generally horizontally and which diverges vertically to define a vertical pattern of varying intensity that is readable by said laser receiver.

9. The laser transmitter and laser receiver for determining the elevation of the receiver with respect to the transmitter according to claim 8, in which said array of laser beam detectors detects the beam and the variations in the beam intensity in a vertical direction such that the vertical position of the laser receiver with respect to the horizontal portion of said laser beam is determined.

10. The laser transmitter and laser receiver for determining the elevation of the receiver with respect to the transmitter according to claim 1, in which the variations in beam intensity define a pattern having vertically spaced, generally horizontal bands of light and in which said pattern includes recognizable reference bands that define the size of the pattern, and in which a portion of the pattern is projected on a horizontal plane.

11. The laser transmitter and laser receiver for determining the elevation of the receiver with respect to the transmitter according to claim 10, in which said recognizable reference bands are vertically spaced in said pattern such that said receiver will receive at least one such band.

12. A method of determining the relative elevation of a laser receiver with respect to a laser transmitter, comprising the steps of:
    projecting a beam of laser light with a laser transmitter in a generally horizontal path, said beam diverging vertically and varying in intensity vertically, and
    detecting the beam of laser light at a plurality of vertically spaced points with a laser receiver including a vertical array of laser detectors such that the vertical position of the laser receiver with respect to the laser transmitter can be determined by determining the position of the laser receiver in the path of the beam of laser light.

13. The method of determining the relative elevation of a laser receiver with respect to a laser transmitter according to claim 12, in which the step of projecting a beam of laser light comprises the step of projecting a beam that has a predetermined vertical pattern, and in which the step of detecting the beam of laser light comprises the step of detecting at least a portion of the pattern defined by said beam such that the portion of the beam detected by the laser receiver may be determined.

14. The method of determining the relative elevation of a laser receiver with respect to a laser transmitter according to claim 13, in which the step of projecting a beam of laser light comprises the step of cyclically varying the pattern defined by the beam such that ambiguities that might otherwise result as to which portion of the beam is detected by the laser receiver are eliminated.

15. The method of determining the relative elevation of a laser receiver with respect to a laser transmitter according to claim 14, in which the pattern includes a reference section which permits the scale of the vertical dimensions of the patterns to be determined.

16. The method of determining the relative elevation of a laser receiver with respect to a laser transmitter according to claim 12, in which the step of projecting a beam of laser light comprises the step of projecting a succession of vertical patterns such that when said receiver detects a portion of the beam, any ambiguity with respect to which portion of the beam is detected is eliminated.

17. The method of determining the relative elevation of a laser receiver with respect to a laser transmitter according to claim 12, in which the step of projecting a beam of laser light comprises the step of projecting variations in the beam intensity to define a pattern having generally horizontal bands of light and in which said pattern includes recognizable reference bands that define the size of the pattern, and in which a portion of the pattern is projected on a horizontal plane.

18. The method of determining the relative elevation of a laser receiver with respect to a laser transmitter according to claim 17, in which said recognizable reference bands are vertically spaced in said pattern such that said receiver will receive at least one such band.

19. In combination, a laser transmitter and a laser receiver for determining the elevation of the receiver with respect to the transmitter, comprising:
- a laser transmitter including a laser light source for providing a beam of laser light and an element for directing the beam such that it diverges vertically and varies in intensity vertically, said element including a micro mirror panel in which portions of the beam are reflected in a predetermined vertical pattern; and
- a laser receiver including an array of laser beam detectors for detecting the beam and the variations in the beam intensity in a vertical direction such that the vertical position of the laser receiver with respect to said laser transmitter can be determined.

20. The laser transmitter and laser receiver for determining the elevation of the receiver with respect to the transmitter according to claim 19, in which said element includes a micro mirror panel arrange in a conical shape for reflecting portions of the beam in a predetermined vertical pattern.

21. The laser transmitter and laser receiver for determining the elevation of the receiver with respect to the transmitter according to claim 19, in which element includes a plurality of micro mirror panels arrange in a pyramid shape for reflecting portions of the beam in a predetermined vertical pattern.

22. The laser transmitter and laser receiver for determining the elevation of the receiver with respect to the transmitter according to claim 19, in which element includes
- a flat micro mirror panel for reflecting portions of the beam received from said laser light source in a predetermined pattern, and
- a conical reflector receiving light from said micro mirror panel and reflecting said portion of the beam generally outward in predetermined vertical pattern.

23. The laser transmitter and laser receiver for determining the elevation of the receiver with respect to the transmitter according to claim 22, in which said portions of the beam received from said laser light source are reflected from said flat micro mirror panel in a predetermined pattern of concentric rings of light and dark areas.

* * * * *